Figure 1:
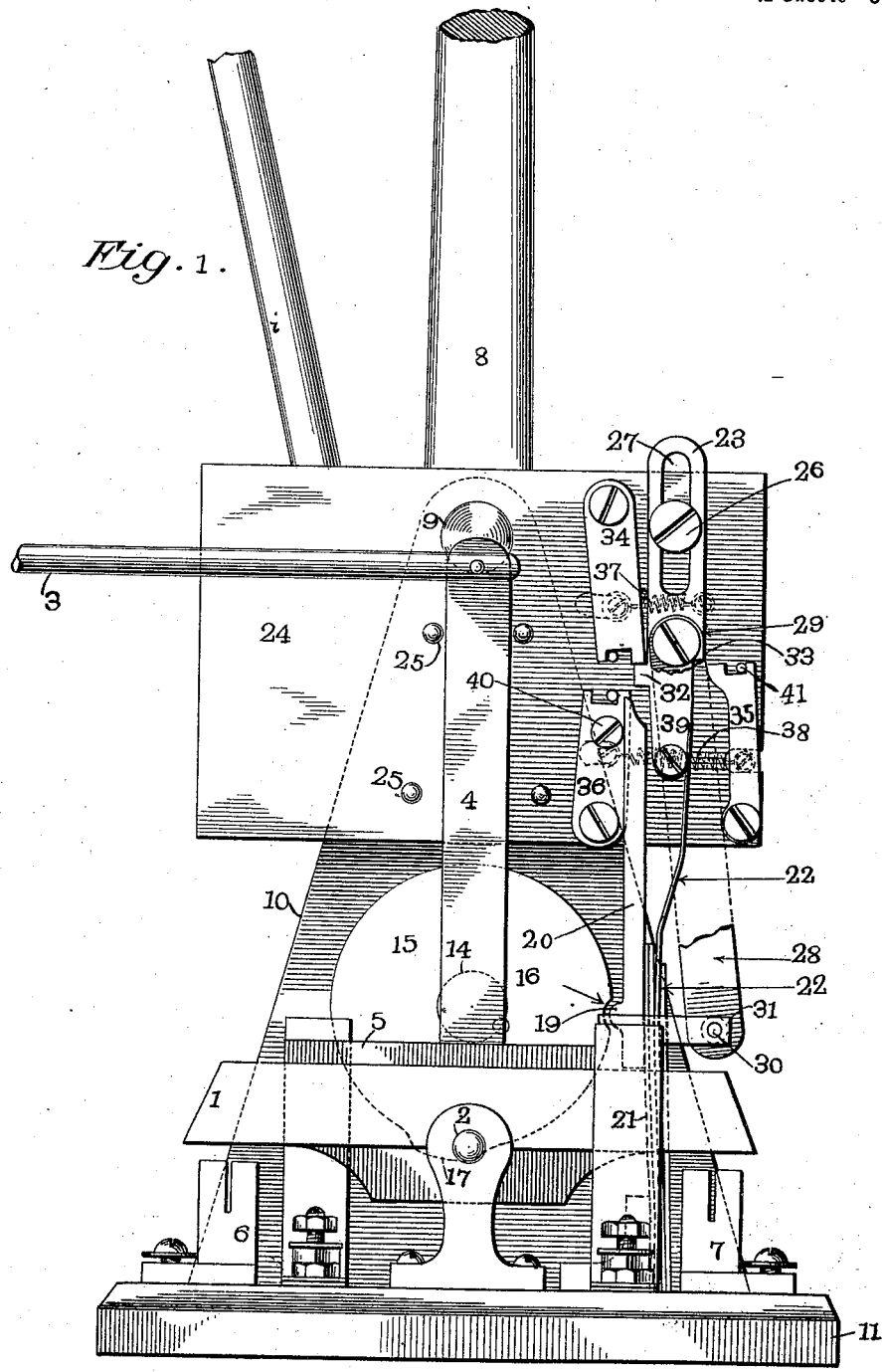

No. 689,453. Patented Dec. 24, 1901.
W. K. BASSFORD, Jr.
LOCK FOR ELECTRIC CONTROLLERS.
(Application filed June 8, 1901.)

(No Model.) 12 Sheets—Sheet 1.

Witnesses
Edward Rowland
Inventor
W. K. BASSFORD, JR.
By his Attorney
Edward P. Thompson No. 689,453. Patented Dec. 24, 1901.
W. K. BASSFORD, Jr.
LOCK FOR ELECTRIC CONTROLLERS.
(Application filed June 8, 1901.)
(No Model.) 12 Sheets—Sheet 3.

Witnesses
Edward C. Rowland.
Anna P. McCole.

Inventor
W. K. BASSFORD, JR.
By his Attorney
Edward P. Thompson

No. 689,453. Patented Dec. 24, 1901.
W. K. BASSFORD, Jr.
LOCK FOR ELECTRIC CONTROLLERS.
(Application filed June 8, 1901.)
(No Model.) 12 Sheets—Sheet 4.

WITNESSES:
A. A. de Bonneville
William P. Franel

INVENTOR
W. K. BASSFORD, JR.
BY
Edward P. Thompson
ATTORNEY

No. 689,453. Patented Dec. 24, 1901.
W. K. BASSFORD, JR.
LOCK FOR ELECTRIC CONTROLLERS.
(Application filed June 8, 1901.)
(No Model.) 12 Sheets—Sheet 5.

WITNESSES:
A. A. de Bonneville
William P. Franck

INVENTOR
W. K. Bassford, Jr
BY
Edward P. Thompson
ATTORNEY

No. 689,453. Patented Dec. 24, 1901.
W. K. BASSFORD, Jr.
LOCK FOR ELECTRIC CONTROLLERS.
(Application filed June 8, 1901.)
(No Model.) 12 Sheets—Sheet 6.
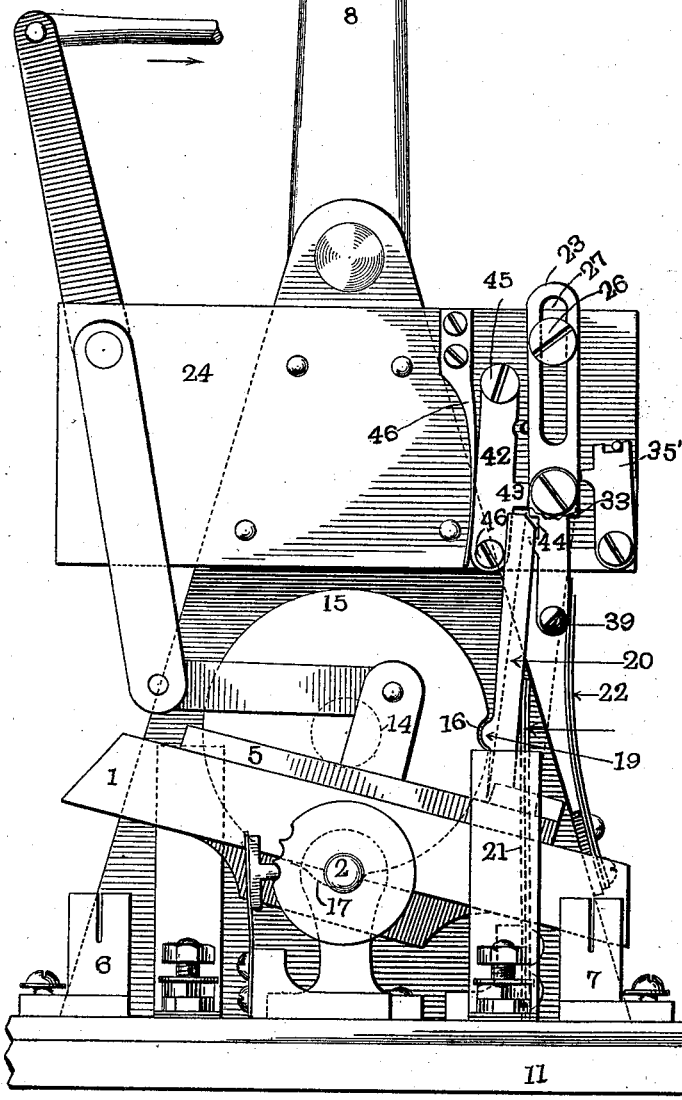
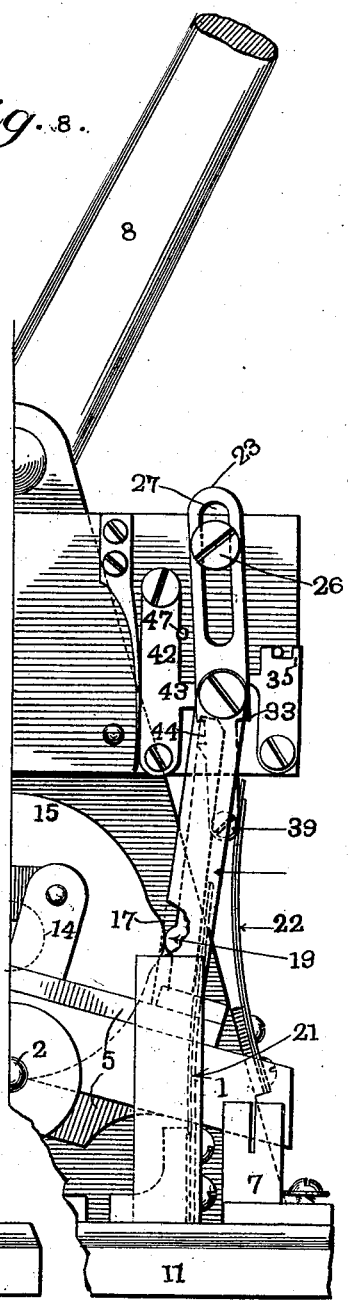

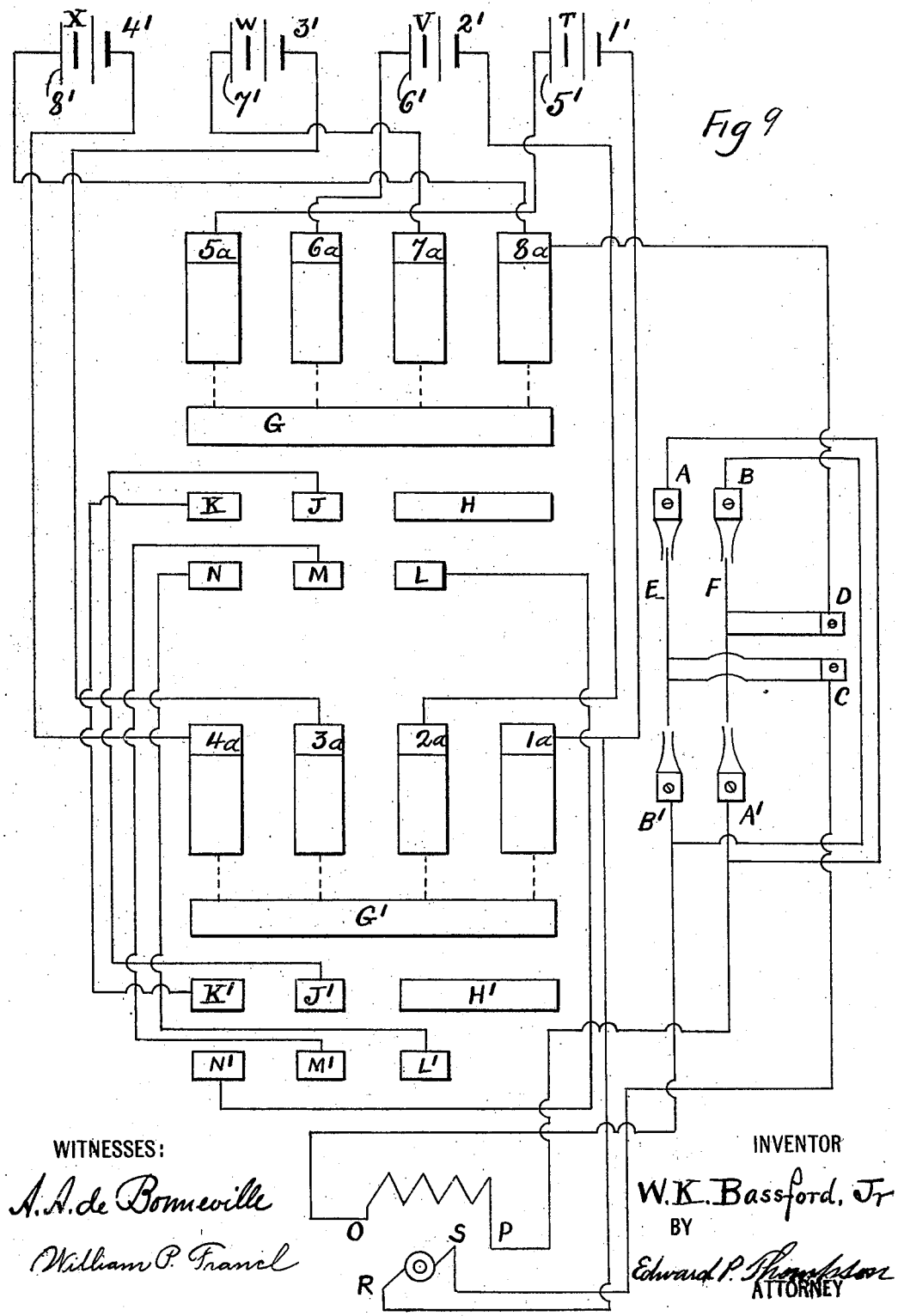

No. 689,453. Patented Dec. 24, 1901.
W. K. BASSFORD, Jr.
LOCK FOR ELECTRIC CONTROLLERS.
(Application filed June 8, 1901.)
(No Model.) 12 Sheets—Sheet 8.

WITNESSES: INVENTOR
A. A. de Bonneville W. K. Bassford Jr
William P. Franel BY
Edward P. Thompson
ATTORNEY

THE NORRIS PETERS CO., PHOTO-LITHO., WASHINGTON, D. C.

No. 689,453. Patented Dec. 24, 1901.
W. K. BASSFORD, Jr.
LOCK FOR ELECTRIC CONTROLLERS.
(Application filed June 8, 1901.)
(No Model.) 12 Sheets—Sheet 10.

No. 689,453. Patented Dec. 24, 1901.
W. K. BASSFORD, Jr.
LOCK FOR ELECTRIC CONTROLLERS.
(Application filed June 8, 1901.)

(No Model.) 12 Sheets—Sheet 12.

WITNESSES:

INVENTOR
W. K. BASSFORD, JR.

BY
Edward P Thompson
ATTORNEY

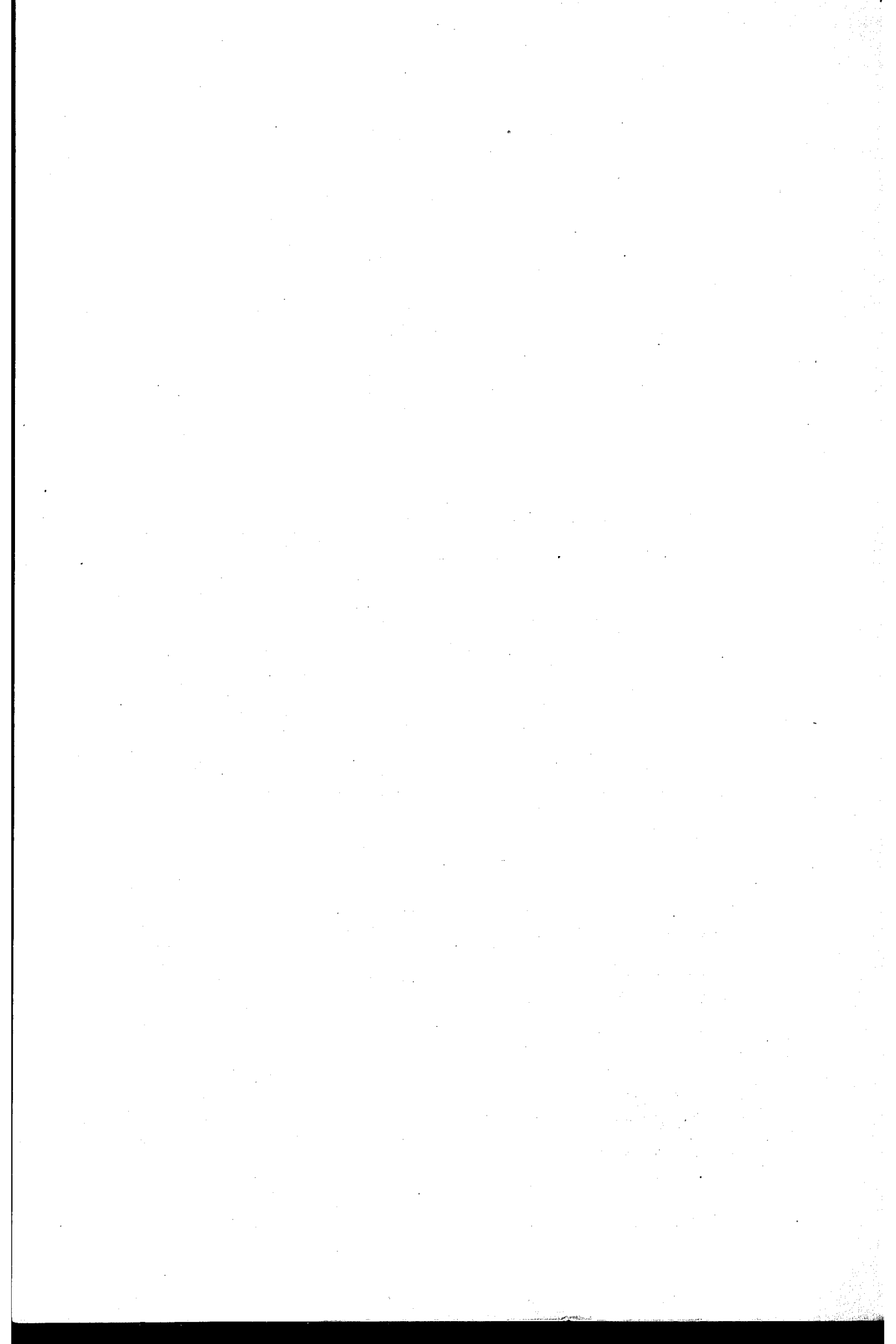

UNITED STATES PATENT OFFICE.

WILLIAM K. BASSFORD, JR., OF BOUNDBROOK, NEW JERSEY.

LOCK FOR ELECTRIC CONTROLLERS.

SPECIFICATION forming part of Letters Patent No. 689,453, dated December 24, 1901.

Application filed June 8, 1901. Serial No. 63,703. (No model.)

*To all whom it may concern:*

Be it known that I, WILLIAM K. BASSFORD, Jr., a citizen of the United States of America, and a resident of Boundbrook, in the county of Somerset and State of New Jersey, have invented certain new and useful Improvements in Locks for Electric Controllers, of which the following is a specification.

The invention has for its object the construction of a device for regulating electric currents and employed for driving a vehicle, such as an automobile or electric car, which carries secondary batteries. The same device, in part, is applicable for regulating electric resistances; but considered as a whole the special object of the invention is to provide mechanism which will prevent armatures from being burned out, the plates of the batteries from damage, and sudden starts of the vehicle. Other merits of the invention will appear from the description.

The organization comprising the invention consists, essentially, of a switch adapted by its movements to open and close the circuit of the motor for driving the vehicle or for opening and closing the charging-circuit. This switch is governed by a handle and a compound locking device, which latter is of such a nature in general that the motor-circuit and charging-circuit can be opened and closed only under predetermined phases of a device for throwing in and cutting out the secondary batteries. Briefly stated, the functions are as follows: When the controller is on full with reference to the storage batteries, the switch cannot close the motor-circuit. When the switch opens the charging-circuit and while the controller is on full, the switch cannot be turned to close the motor-circuit. The motor-circuit cannot be closed until the controller is completely opened. The switch is locked from closing either the motor or charging circuit when the controller is only partly on full. The charging-circuit can be closed only when the controller is on full. If the device is used for charging the batteries, the motor-circuit cannot be closed until the controller is completely opened. While the motor is in circuit the controller may be manipulated for varying the current from minimum to maximum and through all the variations to which the controller is adapted, and at the same time the motor-circuit may be opened at any phase of the controller. If the charging-circuit switch is opened while the controller is off, said switch cannot be closed again until said controller is on full.

Without reference to the drawings the said locking device cannot be made clear, except in a general way. It consists of the combination of levers, slotted and pivoted, and springs so combined in a simple manner that they coöperate to perform the functions required.

The construction thus far outlined does not interfere with the proper operation of a reversing-switch, which is combined with the device, but which cannot permit the current to be reversed until the controller is entirely off.

The figures in general represent the device for locking and unlocking the motor and charging circuit in different phases, a modification of the same represented in two phases, a diagram of the circuits, and a perspective view of the device not well brought out by the other figures.

The scale is not accurately the same in all the drawings and slightly smaller than that of the full working devices from which the drawings were made.

Figure 2:
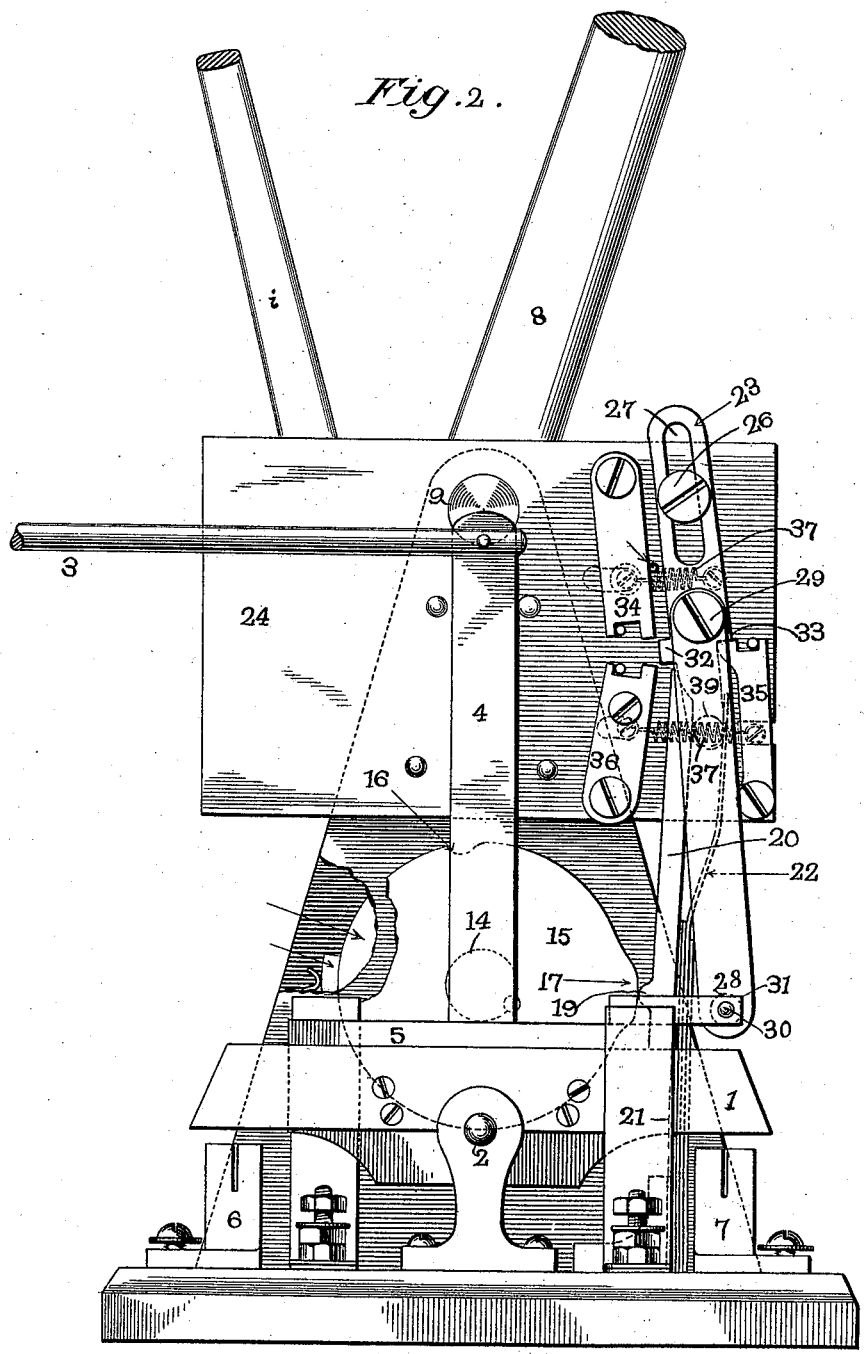
Figure 3:
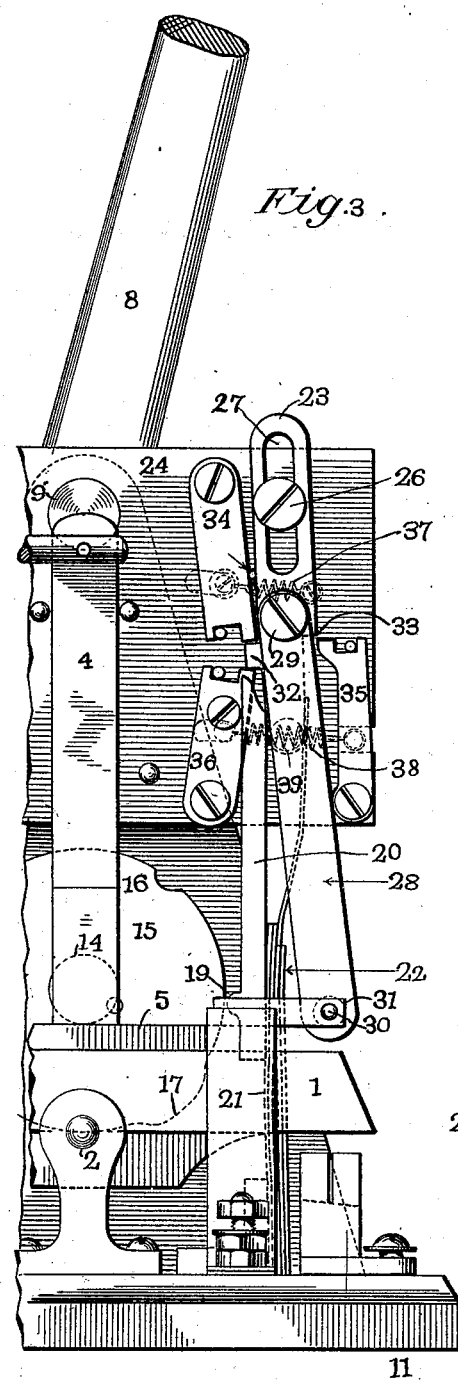
Figure 4:
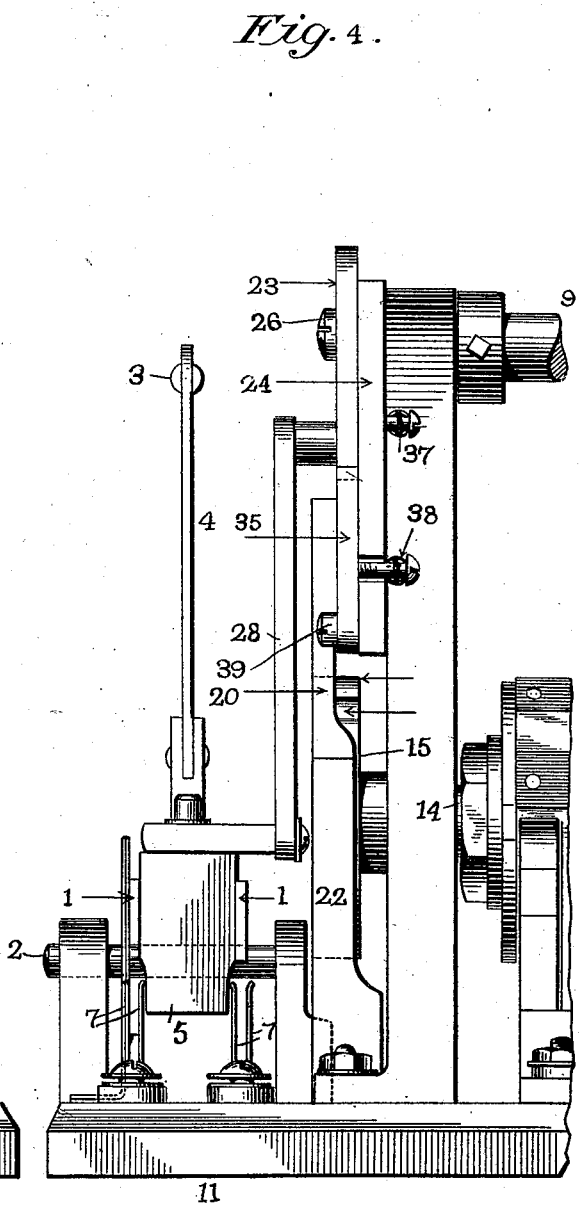
Figure 5:
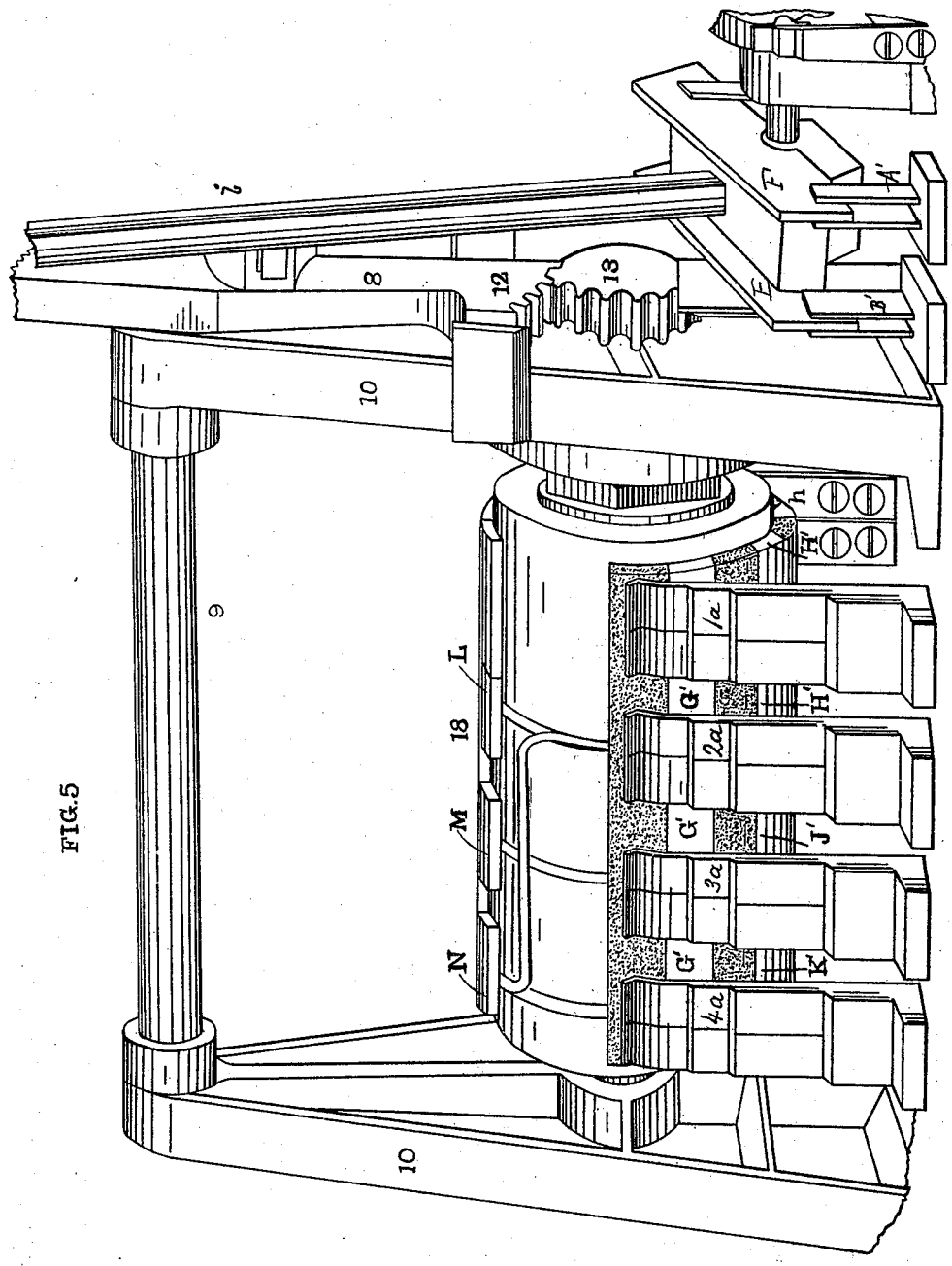
Figure 6:
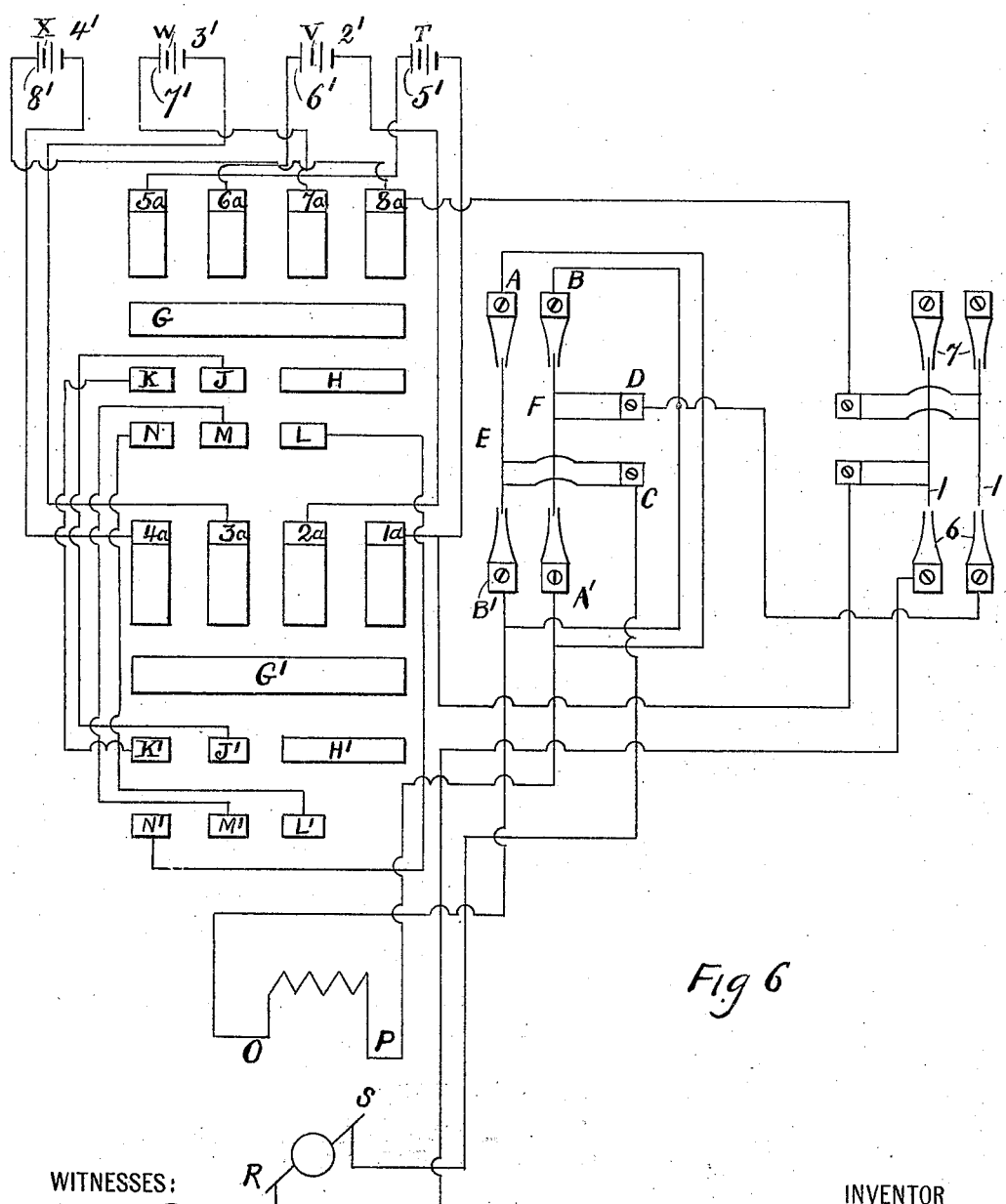
Figure 10:
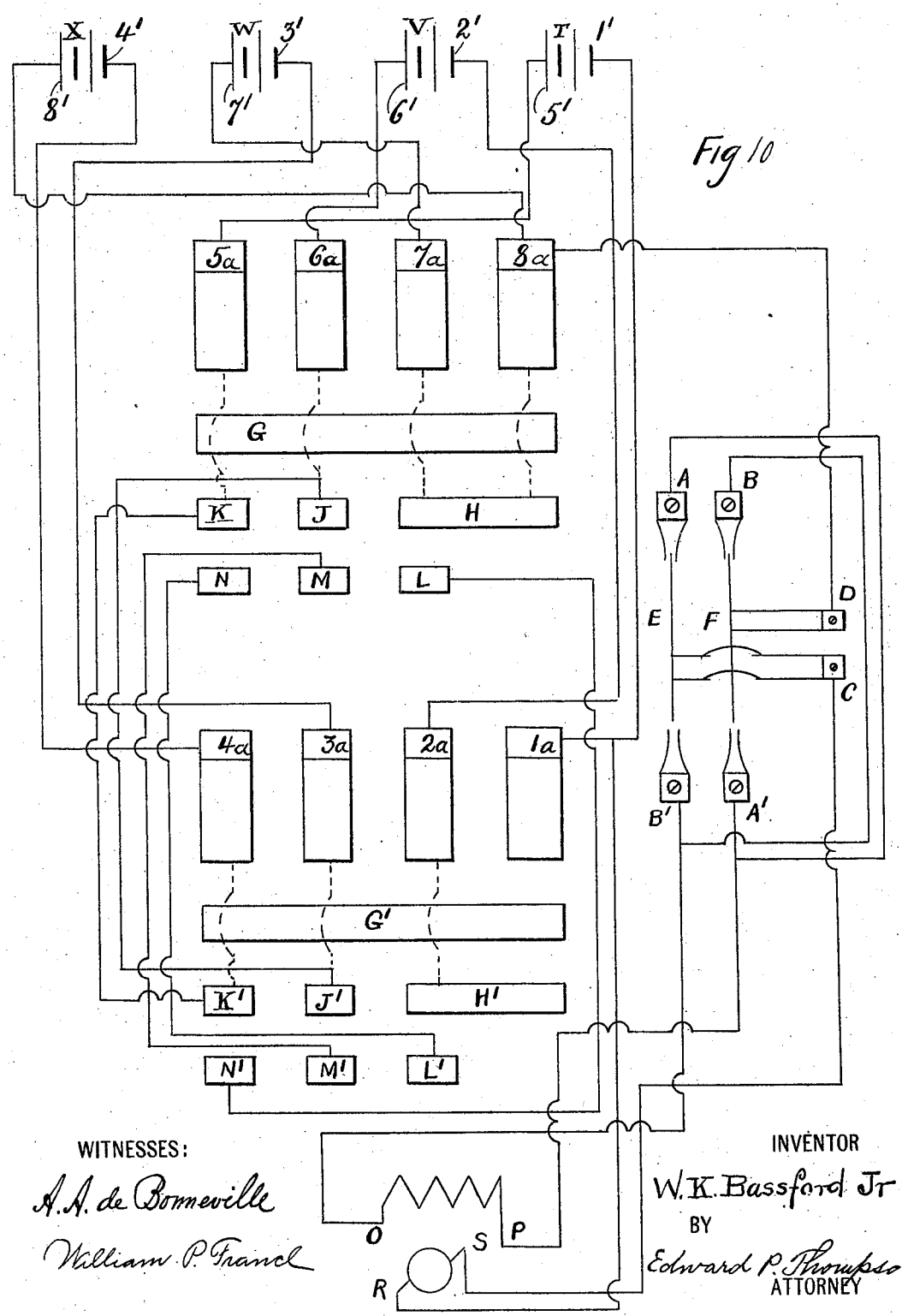
Figure 11:
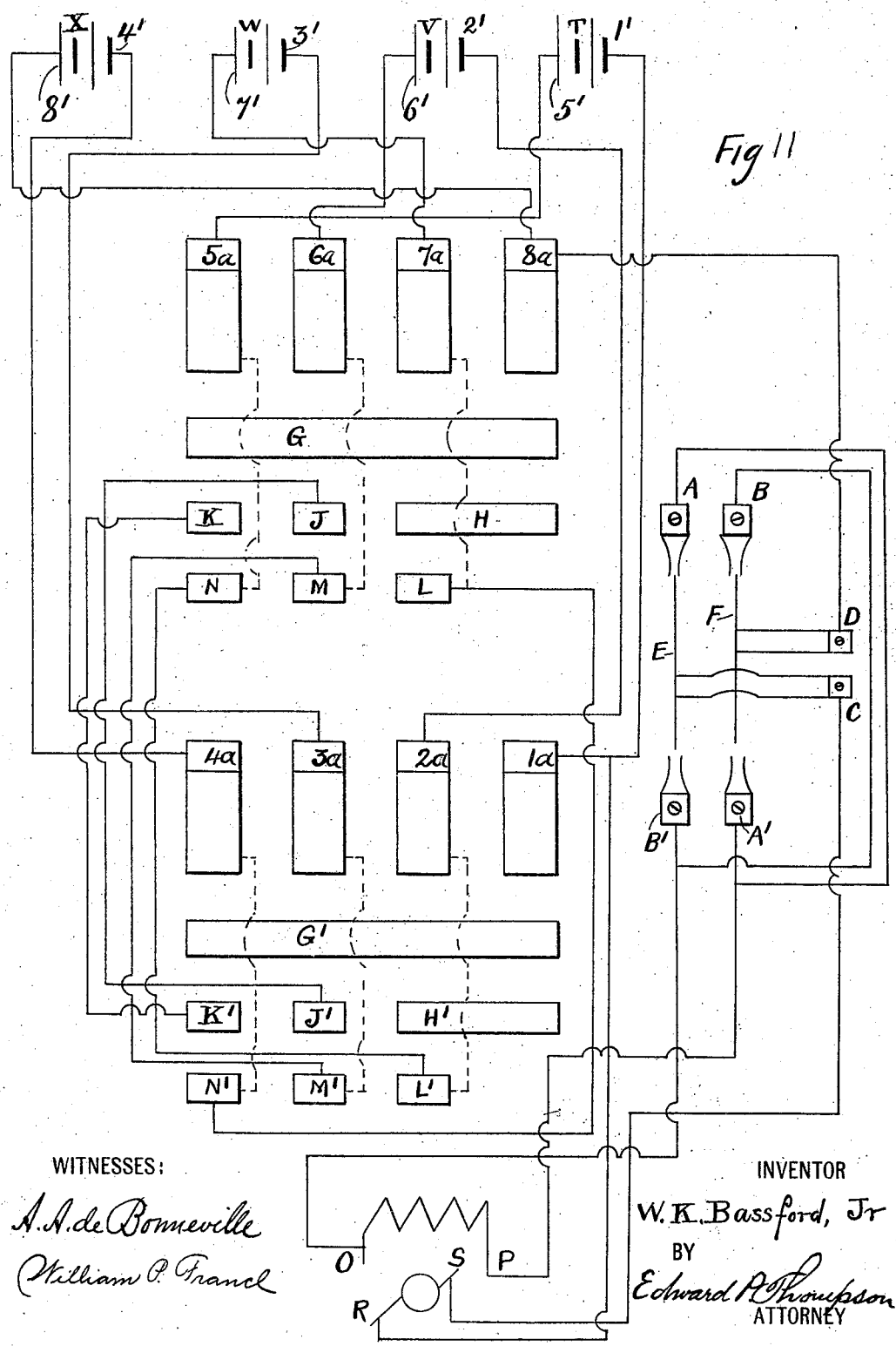
Figure 12:
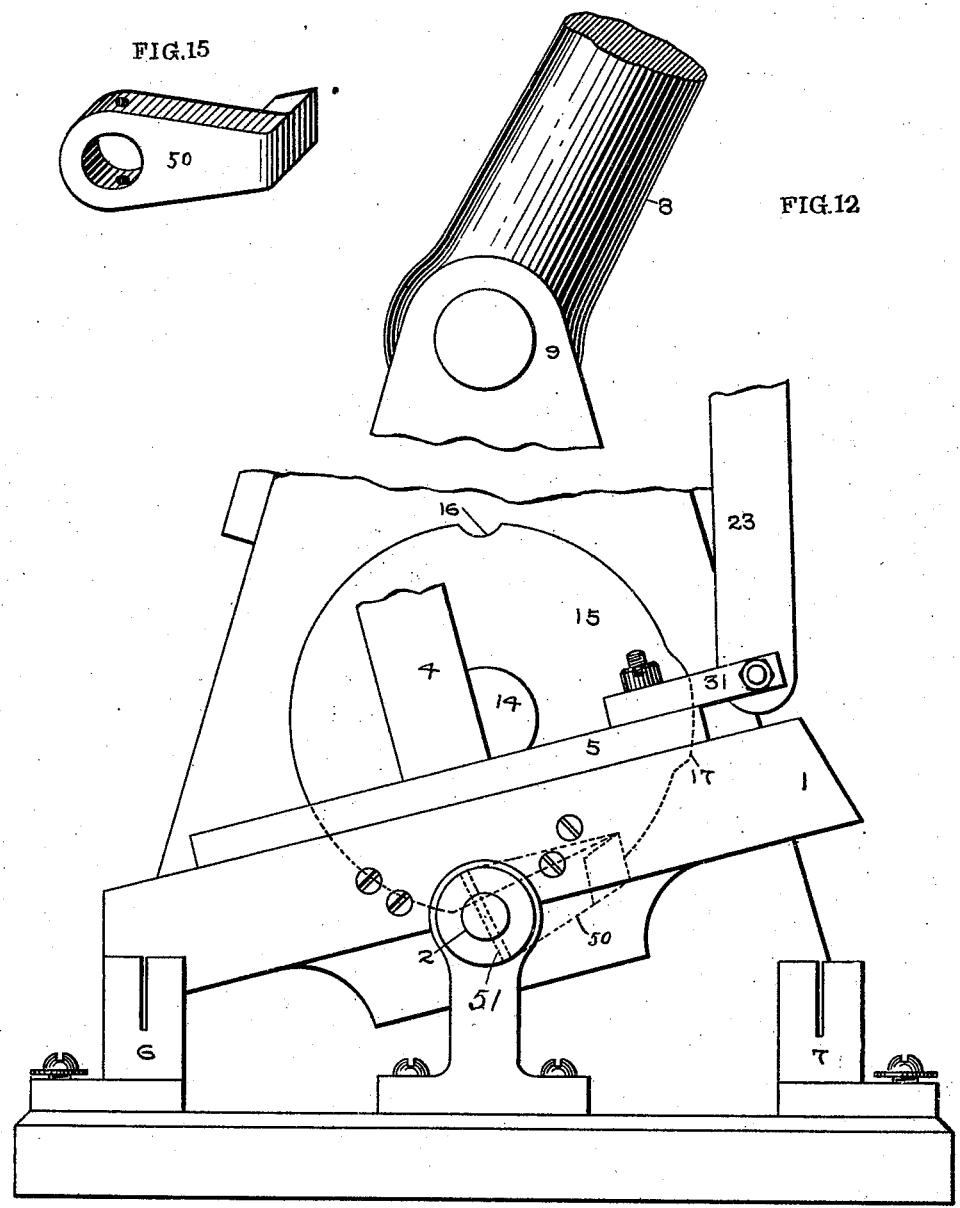
Figure 13:
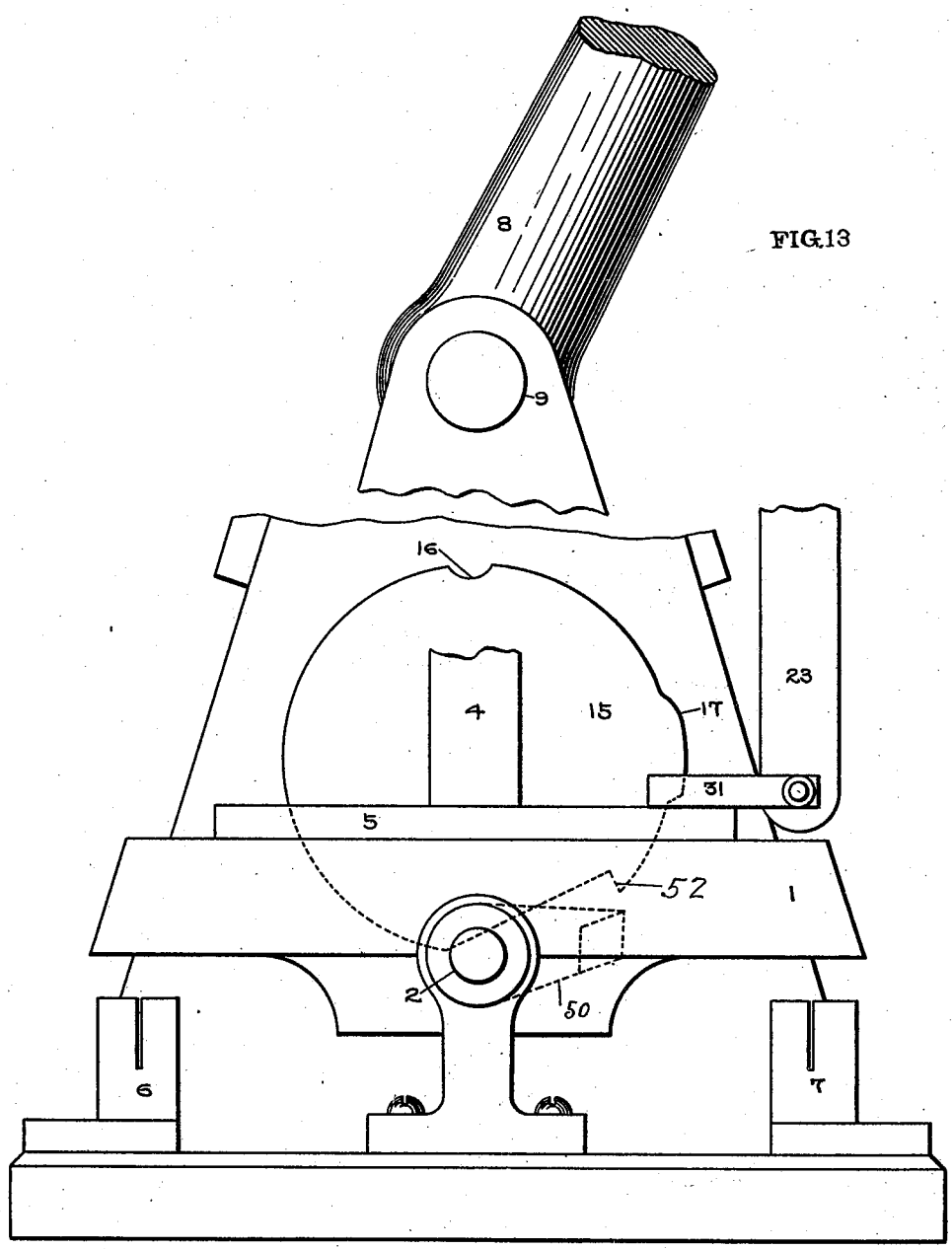
Figure 14:
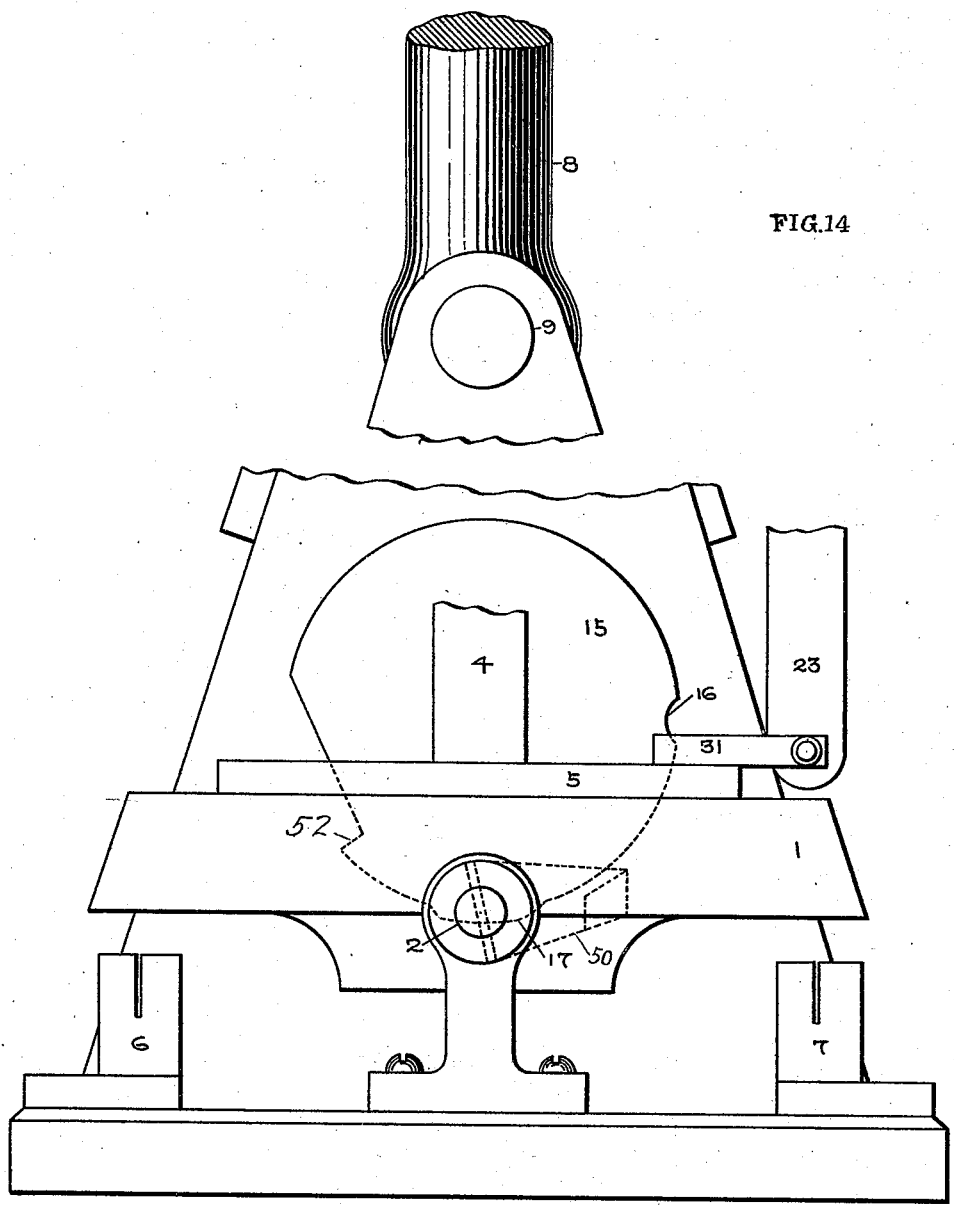

Figure 1 is an end elevation, parts of the long handles and some other parts being broken away. The end represented is that which has the locking device. Fig. 2 is substantially a repetition of Fig. 1 with important exceptions that the phase is different. Furthermore, some of the front parts are broken away in order to show parts which would be otherwise invisible. Fig. 3 shows still further another phase, but much more of the figure is broken away, because not much involved in the new phase. A side view of the front elevation of Figs. 1, 2, and 3 is shown in Fig. 4 in the phase represented in Fig. 3. The controller at the right is mostly broken away. Fig. 5 is a perspective elevation of the remainder of the device. Those parts which are shown in the other figures belong to the left-hand end of Fig. 5, but are omitted, because fully shown in the other figures. Fig. 5 shows the controller, the means for operating, and the reversing-switch, and other features. Fig. 6 is a diagram of the circuits contained upon the vehicle in the phase in which the controller is off, the charging and motor switches being shown. Figs. 7 and 8 are elevations corresponding to Figs. 1, 2, and 3 of a modification of the locking device, Fig. 8 showing only about half shown of that in Fig. 7 and showing a different phase and some of the parts being broken away in both figures. Fig. 9 is a diagram of the circuits connecting the batteries through the controller to the motor. Only the contacts and brushes of the controller are shown. By means of a few dotted lines the circuits may be traced for a first phase of the controller. The charging and motor switches are omitted. Fig. 10 is the same diagram, except that the dotted lines serve to indicate the change in the circuits taking place in a second phase of the controller. Fig. 11 is the same, in which the third phase of the controller has been reached. Fig. 12 is an outline of a portion of the device modified to include an important feature which would not show plainly in the full front views and other views heretofore noticed. Parts of the figure are broken away, and a scale of the other figures is not maintained. The additional feature is shown mostly by dotted lines. Fig. 13 is a view similar to Fig. 12; but the mechanism has a different phase. Fig. 14 shows a similar view of the same device in a still different phase. Fig. 15 is a perspective view of one of the details involved in the device shown in Figs. 12, 13, and 14. In all the three figures the reversing-switch is indicated and also the diagram of the motor.

Referring to Figs. 9, 10, and 11, there are eight brushes or fingers $1^a\ 2^a\ 3^a\ 4^a\ 5^a\ 6^a\ 7^a\ 8^a$, four of which bear upon one side of rotary cylinder 18 and the rest upon the other side of the same cylinder. These brushes are stationary. Now suppose that the cylinder is evolved upon a plane. Then the contacts of the cylinder will have substantially the arrangement shown in Figs. 9, 10, and 11. The first and smallest movement of the cylinder arranged for brings the contact G in touch with the brushes $5^a\ 6^a\ 7^a\ 8^a$ and the contact G' in contact with the brushes $1^a\ 2^a\ 3^a\ 4^a$, the connections between said brushes and said contact being shown in Fig. 9 by dotted lines. The next movement brings the brushes against the contacts K J H, as indicated by dotted lines in Fig. 10, and the brushes $1^a\ 2^a\ 3^a\ 4^a$ against the contacts K' J' H'. The next movement brings the brushes $5^a\ 6^a\ 7^a$ in contact, respectively, with N M L and the brushes $2^a\ 3^a\ 4^a$ against the contacts N' M' L', the dotted lines in Fig. 11 indicating such connections.

The permanent connections will now be described, it being noticed that X W V T are different batteries, O and P the terminals of the field-magnets of the motor, and R and S the brushes of the armature of said motor. E F are the reversing-switch blades. The reversing-switch contacts are A B and A' B'. In Figs. 9, 10, and 11 the reversing-switch blades E F are in contact with the reversing-switch contacts A B. The circuits starting from the positive poles of the batteries are from poles 1' 2' 3' 4', through contact-fingers $1^a\ 2^a\ 3^a\ 4^a$, through barrel-contact G' to contact-finger 1, to armature-terminal R, through armature of motor to armature-terminal S, to reversing-switch-blade contact C, through reversing-switch blade E to reversing-switch contact A, to reversing-switch contact A', to motor-field terminal P, through motor-field to terminal O, to reversing-switch contact B', to reversing-switch contact B, through reversing-switch blade F, to reversing-switch-blade contact D, to contact-finger $8^a$, to contact-fingers $7^a\ 6^a\ 5^a$, through barrel-contact G, and to battery-negatives 5' 6' 7' 8', thus putting batteries T V W X all in parallel with the motor.

Method of reversing the direction and rotation of the motor, whereby the relation of field and armature is to be done, is accomplished by throwing the reversing-switch blades E and F in contact with reversing-switch contacts B' and A', respectively. Now, referring to Fig. 10, the circuits starting from the positive pole of the batteries go from battery-positive 1' through contact-finger $1^a$ to controller-barrel contact H', to armature-terminal R, through armature to S, from S to reversing-switch-blade contact C, through reversing-switch blade E to reversing-switch contact A to A', from A' to motor-field terminal P, through motor-field to terminal O, through reversing-switch contact B' to B, from reversing-switch contact B, through reversing-switch blade F to reversing-switch-blade contact D, to contact-finger $8^a$, and to battery-negative contact 8', through the battery to positive contact 4', to contact 4',to contact-finger $4^a$, to controller-barrel contact K', to controller-barrel contact K, to contact-finger $5^a$, through contact-finger 5 to battery-negative 5', completing the circuit putting batteries T and X in series, from battery-positive 2' to contact-finger $2^a$, to barrel-contact H', to contact-finger $1^a$, from contact-finger a to armature-terminal R, through armature to S, from armature-terminal S to reversing-switch-blade contact C, through reversing-switch blade E to reversing-switch contact A to A', from A' to motor-field terminal P, through motor-field to O, to reversing-switch contact B', to reversing-switch contact B, through reversing-switch blade F to reversing-switch-blade contact D, to contact-finger $8^a$, to controller-barrel contact H, to contact-finger $7^a$, from contact-finger $7^a$ to battery-contact 7', through battery to battery-contact 3', to contact-finger $3^a$, to controller-barrel contact J', to controller-barrel contact J, to contact-finger $6^a$, from contact-finger $6^a$ to battery-terminal 6', thus putting batteries V and W in series, and by means of contact-fingers $7^a$ and $8^a$ being in contact with controller-barrel contact H and contact-fingers $1^a$ and $2^a$ in contact with controller-barrel contact H' the two series T X and V W are put in parallel with the motor.

Now refer to Fig. 11. The circuits start from the positive poles and extend in the following manner: The circuit from the positive 1' to contact-finger 1ª, from contact-finger 1ª to armature-terminal R, through armature to S, from armature-terminal S to reversing-switch-blade contact C, from reversing-switch-blade contact C, through reversing-switch blade E to reversing-switch contact A to A', from A' to motor-field terminal P, through motor-field to terminal O, from terminal O to reversing-switch contact B', to reversing-switch contact B, through reversing-switch blade F, to reversing-switch-blade contact D, to contact-finger 8ª, through battery X to positive terminal 4', to contact-finger 4ª, to controller-barrel contact N', to controller-barrel contact L, from controller-barrel contact L to contact-finger 7ª, from contact-finger 7ª to battery-terminal 7', through battery W to 3', from battery-terminal 3' to contact-finger 3ª, to controller-barrel contact M', to controller-barrel contact M, to contact-finger 6ª, to battery-terminal 6', through battery V to battery-terminal 2', from battery-terminal 2' to contact-finger 2ª, to barrel-contact L', from L' to N, from N to contact-finger 5ª, from 5 to negative-battery terminal 5', thus putting the batteries T V W X all in series with the motor and giving maximum voltage. The result is as follows: Assume that each battery has an electromotive force of twenty volts. In the first place there will be twenty volts, with all batteries parallel with each other and in series with the motor. In the second position there will be forty volts, because two batteries are in parallel and two in series. In the third position there will be eighty volts, as all the batteries will be in series. When the main lever 8 is moved from the position of rest, the reversing-lever i cannot be moved till the main lever is brought back to the normal position, thereby preventing a reversal of the motor when the current is on. The lever 8 may be rocked to and fro upon the shaft 9 for the purpose of turning the cylinder 18 back and forth for the purpose of bringing the contacts thereon against the brushes 1ª 2ª 3ª. The turning of the lever 8, therefore, back and forth turns the barrel 18 to different positions.

Referring to the other drawings, 1 is a switch arranged to turn on the pivot 2 by means of the handle 3, which is pivoted to and extends from the arm 4, which in turn radiates from the block 5 for carrying the switch 1. This switch when swung to the left may close the charging-circuit at the terminal 6 and when swung to the right may close the motor-circuit at the terminals 7. The reverse operations of the switch 1 will open the circuits above named. The adaptability of the switch 1 to be swung back and forth to its three positions is governed by the movements of the controller-handle 8. The circuits need not now be considered. The handle 8 is carried on a rotary shaft 9, supported upon the triangular standards 10, standing upon the base-plate 11. The handle 8 is terminated by a section 12 of a gear-wheel which engages with a wheel 13, which is partially toothed and which is carried at one end of a shaft 14, which is supported in bearings on the standard 10. The other end of the shaft 14 carries a cam 15, which is distinguished by a notch 16 and a curved extension 17 about ninety degrees from said notch. When the handle is turned, therefore, back and forth, the shaft 14 is turned and with it the cam 15. The shaft 14 carries also the barrel 18, which carries the contacts of the controller. An upright position of the controller-handle 8 is the open-circuit position, the controller being entirely open. Fig. 1 shows such a position of said handle. The corresponding position of the notch 16 is at the right-hand side, while the cam 17 is at the lower side, as seen in Fig. 1. The notch 16 is for the partial reception of the tooth 19 on a spring-supported arm 20, carried on the spring 21. In the phase shown in Fig. 1 the spring-arm 20 is located in its farthest left-hand position. In Fig. 2 the controller-handle 8 is at its extreme right-hand limit, the current being on full through the controller. The cam 17 is therefore in a position to force the spring-arm 20 to its farthest right-hand position. In Fig. 3 the handle 8 has an intermediate position and so has the arm 20, because the tooth 19 neither enters the notch 16 nor bears upon the cam 17, but rests against the periphery of the whole cam 15, where it is neither notched nor extended. The movements of the arm 20 are shared by the spring-finger 22, which is under compression against the spring 21. It is this arm 20 which has the function of a key, for it serves as the element, assisted by the spring 22, for opening and closing the lock which limits the motions of the switch 1. The locking of the switch 1 and unlocking it are by the agency of the spring-arm 20 and 22. A rod 23 may conveniently be called the "bolt," because it is that part which is adapted to be held or released by tumblers. Said bolt 23 is held flat against a plate 24, permanently secured to one of the standards 10 by rivet 25; but said bolt 23 is capable of longitudinal and lateral movements, for it is supported on said plate 24 by pivot 26, which projects from the face of the plate 24 and which passes through a slot 27 in said bolt 23. 28 is a connecting-rod between said bolt 23, to which it is pivoted by the pivot 29, and the pivot 30 on the arm 31, extending from the switch 1. In view of the construction any movement of the switch 1 will also move above the bolt 23. When the bolt is locked by the tumblers, said bolt 23 may move through a limited distance and in a restricted direction or it may not move at all, according to the phases of the tumblers. For the purpose of such functions the bolt 23 is provided on the left-hand side with a stump 32 and on the right-hand side with a stopping shoulder 33. In Fig. 1 the tumbler 34 prevents the bolt 23 from moving up. In Fig. 2 the tumbler 35 is in such a position that the bolt 23 cannot move down. In Figs. 3 and 4 the bolt 23 cannot move either up or down, because the tumbler 34 bears on the upper side of the stump 32 and the tumbler 36 bears upon the lower side. The device in Figs. 7 and 8 is not so considered, for it relates to a modification.

The tumblers will now be described. All of them, 34, 35, and 36, are pivoted to the front of the plate 24 and are provided on the back of the plate 24 with retractile springs 37 and 38, the latter simply connecting the tumblers 35 and 36 and therefore serving for both the retractile spring 37 tending to pull the tumbler to the right while the spring 38 tends to pull the tumblers 35 and 36 toward each other. When the bolt 23 is swung to the right, the spring 37 pulls the tumbler 34 to the right, simply because the bolt 23 swings somewhat to the right around the pivot 26, and the said bolt swings to the right, as in Fig. 2, because the arm 20 is moved to the right by the cam 17 and bears against a pin 39 on said bolt 23. The pin 39 consists simply of a screw-head. This is the place to notice that it is the spring 22 which tends to swing the lower portion of the bolt 23 to the left, for said spring presses against the pin 39 on the bolt 23. The tumbler 36 moves to the right when the arm 20 moves to the right, for the reason that the tumbler 36 carries a pin 40, against which the arm 20 normally presses. In Fig. 1 the notch 16 permits the arm 20 to hold the tumbler 36 fully to the left; but when the tooth 19 on the arm 20 is moved to the right, either by the cam 15, as shown in Fig. 3, or by the cam 17, as shown in Fig. 2, the spring 38 pulls the tumbler 36 to the right-hand position. The tumbler 35 is not shown moved to the right in any figures, but it occurs when the switch 1 is closed on the motor-terminal 7 while the controller-handle 8 is off and then turned to the full position. Now when the switch 1 is turned to the off position the bolt 23 will be raised and the tumbler 35 will slide under the shoulder 33 on the bolt 23.

The complete operation of the combination as applied to an automobile, leaving the system of electrical distribution out of the explanation, is as follows: The normal condition of the device is shown in Fig. 1, the controller being disconnected from the secondary batteries, as indicated by the vertical position of said handle. Besides this, the switch 1 is in a normal condition, because it is opened both with respect to the motor-terminal 7 and the charging-terminal 6. Consequently the other elements of the device are also in a normal condition. The device is of such a nature that in its normal condition the switch 1 may be closed upon the motor-terminal 7, as required in all electric vehicles, so that the controller-handle 8 may be turned to the right for the purpose of throwing into circuit more batteries. When the switch 1 is closed upon the terminal 7, which is accomplished by pushing the handle 2 to the right, the connecting-rod 28 is pulled downward, carrying with it the bolt 23, whose shoulder 33 escapes the tumbler 35 and the tumbler 36 and moves away from the tumbler 34. Moreover, the switch 1 may be opened again, because nothing changes the position of the tumblers during the downward and upward movements of the bolt 23. When the bolt 23 moves down, it can move back again while the handle 8 is still vertical, because the rod 20 retains the tumbler 36 out of the path of the stump 32, and a pin 41 on the plate 24, projecting into a slot in the tumbler 35, holds said tumbler out of the path of the shoulder 33.

It will now be explained how the motor-circuit may be opened at any position of the controller-handle and then how it cannot be closed except in the off position of said handle. When the tooth 19 is pressed to the right by the cam 15 or by the cam 17, while the bolt 23 is in the lowest position, it may be noticed that the arm 20 can do no more than strike the pin 39 and swing the bolt 23, as to its lowest portion, to the right, which latter will bear against the tumbler 35 and push it to the right also, to be ready, however, to fall under the shoulder 33 in case the switch 1 should open the terminal 7. Consequently the bolt 23 would be caught by the tumbler 35, and therefore the switch 1 could not be closed again, and therefore also it would be impossible for the motorman to give the vehicle an uncomfortable or injurious shock at starting. At the same time danger in this respect does not depend upon one's memory, but is independent thereof, so that the users of this invention may be certain that the vehicle will always be started with a steady and harmless accelerating speed. After the switch 1 has been opened while the controller-handle is on full, as shown in Fig. 2, nothing prevents the switch 1 from turning still farther and closing the charging-terminals, for it is evident that the stump may pass by the tumbler 34 without obstruction, and after it has passed by the switch 1 may open the charging-terminals, but cannot continue its motion and close the motor-terminals, because the tumbler 35 will strike the shoulder 33. The operation has been sufficiently described, it is believed, in order to understand the construction; but for additional certainty another function of the device will be outlined.

It is desired that neither the motor-circuit nor the charging-circuit should be closed when the controller-handle is in a middle position, including some of the secondary batteries in circuit. The device serves to lock the switch in its open position, when said switch is moved from the position of closing the charging-circuit to the open position and while the controller-handle is midway. The phase is shown in Fig. 3, while the closed position of the switch on the charging-circuit may be outlined by reference to Fig. 3. While the switch 1 is tilted to the left to close the charging-circuit and while the handle 8 is on full the stump 32 is at its highest position and bears against the right-hand side of the tumbler 34, and at the same time said stump is at its farthest right-hand position. Now suppose that the motorman turns the handle 8 to a middle position. This motion will not lower the stump 32, which will still bear against the right-hand side of the tumbler 34; but if the switch 1 is turned again to an open position the stump 32 will descend and the tumbler 34 will be pulled by its retractile spring 37 to the right and locate itself above the stump 32, which will prevent the return of the switch 1, while the tumbler 36 will prevent any further downward motion of the bolt 23, as shown in Fig. 3.

It is evident that the device may be modified without departing from the spirit of the invention. For example, the lock 23 may have a notch in place of the stump 32, the other feature being modified accordingly, as shown in Figs. 7 and 8. In Fig. 7 the controller is in the off phase and the motor-circuit is closed at 7. In Fig. 8 the change is that the controller is turned so as to be on full, while the motor-circuit remains closed. It is thought that these two phases will suffice to illustrate the operation after having explained the preferred form of locking device. Instead of the tumblers 34 and 36 there is one tumbler 42, having a stump 43. The tumbler 35' is about the same as the tumbler 35, except that it is a little shorter, and its function is the same. The notch in the bolt 23 for receiving the stump 43 under certain conditions is shown at 44. The pivot for the tumbler 42 is at 45, while 46 is a pin, against which the spring-arm 20 presses. As this arm has its tooth 16, said arm 20 simply moves to the right and strikes the pin 39 at the lower end of the bolt 23 and pushes said bolt to the right, and the tumbler 42 simply follows because pushed by the spring 46, and the tumbler 35' is merely pushed to the right by the bolt 23. The tumbler 42 cannot, however, move farther to the right, because of the pin 47, and therefore the switch 1 may be shifted over to the charging-circuit terminals 6 without the stump 43 being caught in the notch 44. However, the tumbler 35' will fall under the shoulder 33, so that the motor-circuit 7 cannot be closed again until the controller is turned off.

Referring particularly to Figs. 12 to 15, inclusive, a modification is shown which is also important as showing a feature which may be applied to the device. 50 represents a catch fixed upon the arbor 2 by means of a pin 51, passing through the arbor. The cam-wheel 15 on the shaft 14 has a notch 52 beyond the notch 16 and beyond the cam 17 and in such a position that when the switch 1 is closing the charging-circuit at the terminals 6 and while the controller is on full, with the handle 8 moved entirely to the right, the catch 50 will lie in said notch 51 for preventing the controller from moving back to the normal position, the object being to lock the controller, while the charging-terminals 6 are closed by the switch 1, as shown in Fig. 12. However, at the same time the switch 1 may be opened again, because the catch 50 leaves the notch 52 when the switch 1 is opened from the terminals 6, as shown in Fig. 13. Then and only then can the handle 8 turn to the left and the cam-wheel 15 to its normal position, as shown in Fig. 14.

I claim as my invention—

1. The combination of a controller for regulating electric currents, a switch for opening and closing the motor-circuit and for opening and closing the charging-circuit, said switch being movable to open the motor-circuit during any phase of said controller and to open the charging-circuit during any phase of the controller, and to close the motor-circuit only during the off position of said controller, and to close the charging-circuit only when said controller is on full.

2. The combination of a controller for regulating electric currents, a switch for opening and closing the motor-circuit and for opening and closing the charging-circuit, and a lock governed by said controller for limiting the movements of said switch.

3. The combination of a controller for regulating electric currents, a switch for opening and closing the motor-circuit and for opening and closing the charging-circuit, and a lock governed by said controller, for releasing said switch to close said charging-circuit at the full "on" phase of said controller, and to stop said switch from closing said motor-circuit at the same phase of said switch.

4. The combination of a controller for regulating electric currents, a switch for opening and closing the motor-circuit and for opening and closing the charging-circuit, and a lock governed by said controller, and connected up with said switch, for stopping said switch from closing either of said circuits at the midway phase of said controller.

5. The combination of a controller for regulating electric currents, a switch for opening and closing the motor-circuit, and for opening and closing the charging-circuit, and a lock governed by said controller, and connected up with said switch, for stopping said switch from closing said charging-circuit and for releasing said switch to close said motor-circuit during the midway phase of said controller.

6. The combination of a controller for regulating electric currents, a switch for opening and closing the motor-circuit and for opening and closing the charging-circuit, a spring adapted to be swung to and fro through the agency of said controller, a bolt movable